B. B. ELLERBECK.
CONVERTIBLE AUTOMOBILE TOP.
APPLICATION FILED DEC. 9, 1919.
1,379,906.
Patented May 31, 1921.
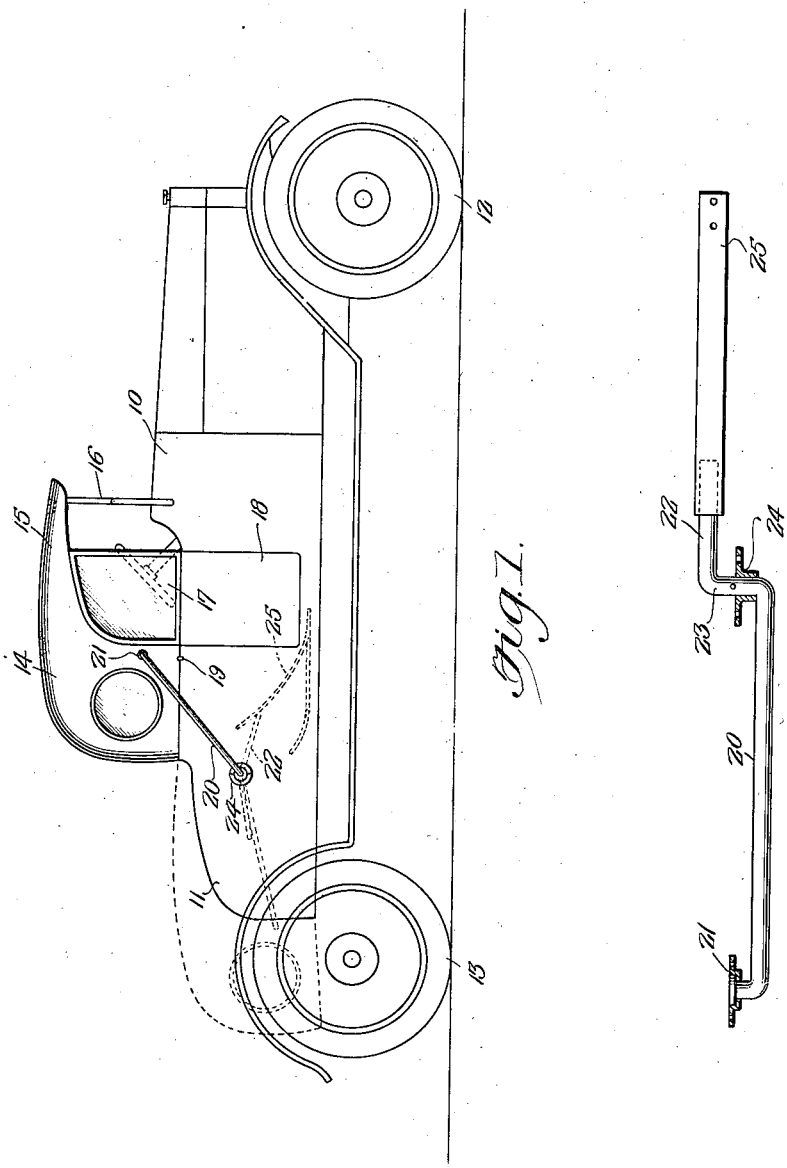
WITNESSES
INVENTOR
B.B.Ellerbeck,
BY
ATTORNEYS

UNITED STATES PATENT OFFICE.

BEN BROWN ELLERBECK, OF WASHINGTON, DISTRICT OF COLUMBIA.

CONVERTIBLE AUTOMOBILE-TOP.

1,379,906. Specification of Letters Patent. Patented May 31, 1921.

Application filed December 9, 1919. Serial No. 343,564.

*To all whom it may concern:*

Be it known that I, BEN BROWN ELLERBECK, a citizen of the United States, and a resident of Washington, in the District of Columbia, have invented certain new and useful Improvements in Convertible Automobile-Tops, of which the following is a specification.

My present invention relates generally to automobile tops, and more particularly to rigid tops, especially for two passenger vehicles or what is known as the roadster type of vehicle, my object being the provision of an arrangement whereby the rigid top with or without sliding, swinging or otherwise mounted windows, may be shifted bodily on connections with the vehicle into and out of effective position from the vehicle seat, the said top in its inoperative position being located on that portion of the vehicle body rearwardly of its seat.

The preferred manner of carrying out the invention is illustrated in the accompanying drawing which forms a part of this specification, and in which, Figure 1, is a side elevation showing a vehicle equipped with my improvements, the latter being illustrated in full and dotted lines respectively in its active and inactive positions, and Fig. 2 is a sectional view of one of the top supporting connections.

Referring now to these figures, I have generally indicated the body of a vehicle of two passenger or roadster type at 10, and have shown the same provided with a rearwardly and downwardly sloping extension at the rear of its seat as indicated at 11, the usual front and rear wheels being shown respectively at 12 and 13.

The top 14 as proposed by my invention is preferably of a rigid type as distinguished from flexible foldable tops, and engages the upper edge of the body 10 at the rear and sides of its seat and has an upper forward extension 15, the entire lower surface of which together with the front edges of the sides of the top, conform in curvature to the contour of the rear body extension 11. The upper forward extension of the top 14 previously mentioned and as shown at 15, may carry any suitable clamps for engagement with the windshield 16 and may have any form of side windows 17, the latter of which may either be hinged to the top 14 to swing inwardly against the sides thereof or may be slidably mounted in connection with the side doors 18.

These windows 17 are simply mentioned to show the adaptability of the top 14 to entirely inclose the driver's space and convert a normally open car into a coupé type.

The top 14 may be detachably clamped in any suitable manner as by means of clamping studs shown at its sides at 19 and its opposite sides are movably supported with respect to the body 10 upon the outer ends of swinging supporting arms 20, the outer ends of which are headed and rotatably disposed in connection with socket members 21 attached to the top. At their inner ends the supporting arms 20 have offset extensions 22 within the body 10 for which purpose their angular portions 23 are journaled through brackets 24 secured to the rear portions of the body sides, thus adapting the top 14 to swing in a vertical plane rearwardly and downwardly from its active position shown in full lines in Fig. 1 to its inactive position shown in dotted lines, where its forward portion fits upon the rear body extension 11. In its inactive position, the rear portion of the top 14 may house tire carriers, gasolene tanks and the like.

The offset inner extensions 22 of the supporting side arms thus swing like the arms 20, upon the fulcrums formed by the angular portions 23 in brackets 24 and in the rearward inactive position of the top, these extensions 22 are at their upper forward positions, from which they swing downwardly and rearwardly when the top 14 is lifted and swung to the active position. To assist this latter movement, I preferably include within the body 10 normally horizontal leaf springs 25, rigidly connected at their forward ends and the rear free ends of which are adapted for engagement by the extensions 22 as the latter swings forwardly and upwardly, thus placing the springs 25 under tension so that the dead weight of the top 14 will be relieved to some extent upon its subsequent elevating movement to active position.

It is obvious my invention provides a convertible automobile top capable of ready manipulation and easy and quick movement into and out of position, one which may be made to conform to the tastes of particular persons as regards open or closed styles and one which even when in inactive position is still capable of functioning to the extent of forming a housing and a protection for gasolene tanks, tire carriers and the like.

I claim:—

1. The combination with an automobile body having a seat and a top receiving edge adjacent to the seat, of a rigid top having an upper wall and side and rear walls, the lower edges of the side and rear walls of which are seated in active position and in detachable relation upon the said top receiving edge of the body, and connections between the said rigid top and the body on which the former is movable rearwardly and downwardly and maintained in approximately perpendicular relation at all times so as to form a downwardly opening housing member at the rear of the seat in its inoperative position.

2. The combination with a vehicle body having a seat and a top supporting edge, of a rigid top detachably supported on said body edge, and swinging supporting arms at opposite sides of the body connected thereto, and to the said top and upon which the latter is swingable rearwardly and downwardly from the seat and independently tiltable to form a cover for the lower rear portion of the body, as described.

3. The combination with a vehicle body having a seat, of a rigid top detachably connected adjacent to the seat, and swinging supporting arms at opposite sides of the body connected thereto and to the said top and upon which the latter is swingable rearwardly and downwardly from the seat, said supporting arms having lower extensions within the vehicle body, and springs disposed for engagement with the said extensions when the top is lowered, as and for the purpose described.

BEN BROWN ELLERBECK.